A. B. COUCH.
RICE HULLING MACHINE.
APPLICATION FILED FEB. 18, 1909.
988,931.
Patented Apr. 4, 1911.
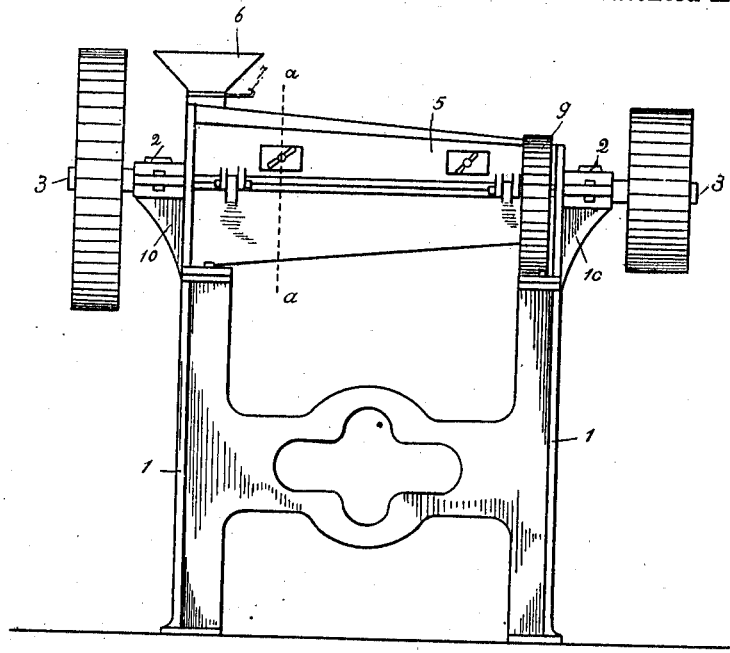
Fig 1
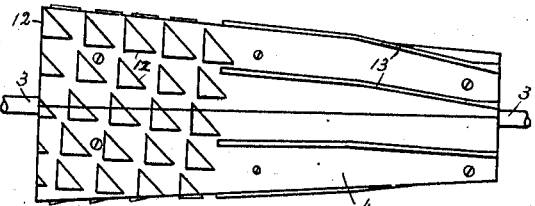
Fig 2
Fig 3
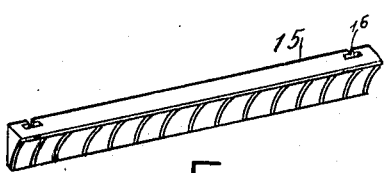
Fig 4
WITNESSES:
INVENTOR.
Albert B. Couch
By Edward V. Hardway
ATTORNEY.

UNITED STATES PATENT OFFICE.

ALBERT B. COUCH, OF HOUSTON, TEXAS.

RICE-HULLING MACHINE.

988,931.  Specification of Letters Patent.  Patented Apr. 4, 1911.

Application filed February 18, 1909. Serial No. 478,656.

*To all whom it may concern:*

Be it known that I, ALBERT B. COUCH, a citizen of the United States, residing at Houston, in the county of Harris and State of Texas, have invented certain new and useful Improvements in Rice-Hulling Machines, of which the following is a specification.

My invention relates to new and useful improvements in grain hulling machines and more particularly to such machines as are specially adapted to hull rice.

The invention comprehends certain improvements on Letters Patent of the United States granted to me on July 25, 1899, numbered 629,547 and Letters Patent of the United States granted to me on Jan. 26, 1904 and numbered 750,610, the object of the invention being to increase the capacity and reduce the cost of manufacture relative to the capacity of the machine as well as to simplify and make certain improvements in the detailed construction.

Another object of the invention is to provide an improved hulling cylinder or cone whereby the grain will be relieved of its hulls, coatings, etc., without being broken or cracked and without having its flavor impaired by being superheated.

Finally the object of the invention is to provide a device of the character described, that will be easily constructed and operated, one which may be readily taken apart for repairs and one in which the several parts will not be liable to get out of working order.

With the above and other objects in view my invention has particular relation to certain novel features of construction and operation, an example of which is described in this specification and illustrated in the accompanying drawings, wherein:—

Figure 1 is a side elevation of a machine embodying my invention. Fig. 2 is an enlarged transverse sectional view of the huller-cone and casing therefor, taken on the line *a—a* of Fig. 1. Fig. 3 is a side elevation of the huller-cone. Fig. 4 is a detailed view of the huller-bar.

Referring now, more particularly, to the drawings, wherein like numerals of reference designate similar parts in each of the figures, the numeral 1 refers to a suitable frame which is provided with bearings 2. In these bearings a suitable shaft 3 is revolubly supported. This shaft carries the huller-cone 4, which is rigidly mounted upon said shaft and which revolves therewith. This huller-cone is inclosed in a suitable casing 5, divided longitudinally, as shown in Figs. 1 and 2, substantially on the axis of said cone, the upper half of said casing being of sheet metal and at the larger or entrant end being provided with a hopper 6 whose delivery end is controlled by a suitable sliding gate 7. The lower portion of this cone-casing is of perforated metal, indicated by the numeral 8 and shown in Fig. 2. The small or discharge end of this casing 5 is provided with a suitable discharge 9 by means of which the hulled grain is conducted from the huller and delivered to any suitable receptacle prepared for its reception. In case the casing and huller-cone just described is used in connection with my grain huller patented Jan. 26, 1904 and above referred to, this discharge 9 should be so constructed as to deliver to the hopper of the polishing-cone.

The member 4 is preferably, a conical frustum but may be cylindrical in shape and the casing 5 should be made to conform to the shape of the cylinder. It will hereinafter be referred to, however, as a huller-cone. The casing 5 is supported upon the frame 1 by suitable supporting members 10 secured to said frame.

The huller-cone is, preferably, constructed of a tubular core to the outer surface of which a plurality of plates 11, equal in length to the length of said core, and shaped to conform to the surface thereof, are secured by means of screws or bolts. These plates fit closely together at their edges and form a snug fitting incasement for the tubular core referred to above. These peripheral plates 11 are provided at their entrant ends with triangular shaped raised portions or knobs 12. These knobs, preferably, have the shape of a right-triangle with the base thereof substantially parallel with the axis of the cone, the altitude of which is perpendicular thereto and whose hypotenuse faces in the direction of the discharge end of the huller-cone. These triangular shaped elevations are arranged in parallel rows spiraled rearwardly around the cone, preferably, at an angle of about forty-five degrees, with the sides thereof, which face toward the discharge end, having a corresponding slope and being in substantial alinement with each other. They are so positioned that the apex of each knob will about equally divide the space between the two knobs immediately above it on the cone so as to separate the stream of grain passing down between the said two knobs or elevations and throw a portion of it forwardly and a portion rearwardly and thus increase the friction. The rows of elevations on the plates 11 are so arranged that the rows on one shall be a continuation of their respective rows on the others. The discharge end of these plates 11 are provided with a plurality, preferably two, of ribs 13, the main portions of which are parallel with the axial line of the huller-cone but the discharge ends of which have a slight retard or rearward spiral and end in a slightly upward turn. These ribs are of a height above the surface of the plates 11 equal to the height of knobs 12 and both the knobs and ribs are of such a height above the surface of said plate that they will pass by the upper edge of the huller-bar 14 as shown in Fig. 2. That side of huller-bar 14 next to the surface of the cone is provided with a series of spiraled corrugations and the direction of the inclination of these corrugations is contrary to the course of the grain passing through the casing to the end that the passage of the grains may be restrained to a certain degree. Furthermore the face of this huller-bar is concaved longitudinally on a shorter radius than that of the huller cone to the end that the passage between the cone and the upper edge of the huller-bar shall be still further restricted, as shown in Fig. 2. The huller-bar 14 is adjustable toward and from the surface of the huller cone by means of hand screws 15, having a head thereon for engagement with the T-slots 16 located in the back side of the huller-bar, all of which is shown in Figs. 2 and 4.

While the grains are subjected to the action of the hulling members 12 and 13 the hulls and kernels are separated, and many of the finer particles of the hulls will drop through the lower perforated half 8 of the cone-casing and may be caught in any suitable receptacle provided for that purpose.

The hulling process is accomplished as follows:—The grain is first placed into hopper 6 and passes therefrom into the entrant end of the casing 5 and onto the huller cone. The front side of this cone moves upwardly while in revolution and the grain first comes into contact with the inclined faces of the triangular elevations 12 thereon. The grain is thus thrown forwardly but comes into contact with the sides of the elevations facing toward the entrant end of the cone and the corrugations of huller-bar 14 is thereby retarded and forced downward in streams between the elevations 12, each stream being separated into two by the apexes of the succeeding elevations or knobs 12, thus subjecting the grain to great friction. This scrubbing process is continued as the grain is gradually forced toward the discharge end of the cylinder and the hulls, cuticle and gummy coating are effectually scoured from the grain. The grain then passes within reach of the ribs 13 and is precipitated by them toward the discharge end of the cone and is forced into discharge 9.

The cone 4 and its casing 5 have the shape of true cones but the axis of the shaft 3 is located eccentric to the axis of the casing, to the end that between one side of said cone and that side of the casing nearest thereto there shall be provided a space which narrows constantly between one point on said cone and its opposite point, and at this narrowest point the metal huller-bar 14 is located. The result of this construction is that from a point opposite the huller-bar, channel or space between the cone and its casing which the grain must follow is substantially helical when looked at in cross section.

From the above description of the huller-cone it will be seen that the grain delivered through the hopper 6 will be constantly forced by the elevations 12 toward the small end of the cone and will be expelled through discharge 9 by the pressure of the mass behind, also that during its transit through the cone casing it will be subjected between the huller-bar 15 and the cone to a rolling and rubbing action, which will crack and remove the hulls from the grain; that a large part of the finer particles of the hulls will sift through the perforated plate which constitutes the lower half of the cone casing.

The complete separation of the hulls from the grain is effected by subsequent operation and my polisher as described in my Letters Patent Number 750,610 above referred to may be utilized for that purpose in connection with the herein described machine.

I desire to here observe that the huller-cone, herein described, may also be used as a polisher cone, and will be found to be very efficient in that connection. It is further to be observed that a huller cone constructed and eccentrically disposed, in its casing, as described will effectively remove the hulls from the grain without the use of the huller-bar although it is believed that said bar when used in conjunction with said huller-cone will make the machine more effective and thus increase its capacity and value.

What I claim is:—

1. In a grain hulling machine, the combination with a casing, of a hulling member rotatably supported therein and having its axis of rotation eccentric to the axial line of said casing, means carried by the entrant end of said hulling member for simultaneously creating forward and rearward movements to different portions of grain fed onto said hulling member, a huller bar in said casing whose operative surface is concave and the axis of which surface is eccentric to that of the hulling member, the said surface of said bar having spirally disposed ribs thereon oppositely inclined to the direction of the movement of the grain from one end of the hulling member to the other.

2. In a grain hulling machine, a hulling member comprising a core with a convex outer surface, peripheral plates shaped to conform thereto and adapted to fit thereon, polygonal elevations carried by the entrant ends of said plates and so located with reference to each other that the apex of each elevation will divide the space separating, laterally, the elevations thereabove, the sides of said elevations facing the discharge end of said cylinder being alined with each other in a rearward spiral.

3. In a grain hulling machine, a hulling member comprising a core with a convex outer surface, peripheral plates shaped to conform thereto and adapted to fit thereon, triangular elevations carried by the entrant ends of said plates and so located with reference to each other as to separate the mass of grain fed onto said member into two portions and impart a forward motion to one of said portions and a rearward motion to the other of said portions, the sides of said elevations facing the discharge end of said cylinder being alined with each other in a rearward spiral.

4. In a grain hulling machine, a rotatable hulling member, a casing therefor, triangular means carried by said hulling member so located with reference to each other as to separate the mass of grain fed onto said member into many portions, and to impart a forward motion to a portion of the grain coming into contact with each elevation and a rearward motion to the other portion of the grain coming into contact with said elevation, an inlet opening in said casing, an outlet opening at the discharge end of said casing, a huller bar parallel with the surface of the hulling member and adjustably supported by said casing and means for adjusting said bar toward and from said hulling member.

5. In a grain hulling machine, a hulling member comprising a core with a convex outer surface, peripheral plates shaped to conform thereto and adapted to fit thereon, triangular elevations carried by the entrant ends of said plates whose operative faces are alined with each other in a rearward spiral, and ribs carried by the discharge end of said plates extending from said elevations to the discharge end of said plates.

6. In a grain hulling machine, a hulling member comprising a support, peripheral plates shaped to conform thereto and adapted to fit thereon, elevations carried by the entrant ends of said plates, polygonal in shape and so located with reference to each other as to impart a forward motion to the grain fed onto said member, and ribs carried by the discharge end of said member having three deflections, substantially longitudinal, rearwardly spiraled and ending in a slight forward spiral.

7. In a grain hulling machine, the combination with a casing, of a hulling member rotatably supported therein and having its axis of rotation eccentric to the axial line of said casing, triangular elevations carried by said hulling member for simultaneously creating forward and rearward movements to different portions of grain fed onto said hulling member, a huller bar in said casing whose operative surface is concave, the said surface of said bar having spirally disposed ribs thereon oppositely inclined to the direction of the movement of the grain from one end of the hulling member to the other.

8. In a grain hulling machine, a hulling member comprising a conical shaped body portion and non-continuous ribs carried upon the periphery thereof and rearwardly spiraled therearound, the sections of each rib being so located with reference to the sections of the rib located thereabove, as to divide the lateral space between the sections of said last mentioned rib.

9. In a grain hulling machine, a hulling member with a convex outer surface, polygonal elevations carried by the entrant end of said member and so located with reference to each other that the apex of each elevation will divide the space separating, laterally, the elevations thereabove, the sides of said elevations facing the discharge end of said cylinder being alined with each other in a rearward spiral and longitudinal ribs extending from said elevations to the discharge end of the hulling members.

10. In a grain hulling machine the combination with a casing, of a hulling member rotatably supported therein and having a convex outer surface, polygonal elevations carried by the entrant end of said member and so located with reference to each other that the apex of each elevation will divide the space separating, laterally, the elevations thereabove, the sides of said elevations facing the discharge end of said cylinder being alined with each other in a rearward spiral and a hulling bar adjustably mounted in said casing, whose operative surface opposes said hulling member and is capable of adjustment toward and from the same.

11. In a grain hulling machine, a hulling member with a convex outer surface, triangular elevations carried thereby on the entrant end thereof, said elevations being arranged in rearward spirals and having their sides facing the discharge end of said members in substantial alinement, ribs carried by said cylinder extending from said elevations to the discharge end of the cylinder and terminating in a slight forward spiral.

12. In a grain hulling machine, the combination with a casing, of a hulling member rotatably supported thereon and having its axis of rotation eccentric to the axial line of said casing, elevations carried by said hulling member for simultaneously creating rearward and forward movements to different portions of grain fed onto said hulling member, a huller bar in said casing whose operative surface is concave the said surface of said bar having spirally disposed ribs thereon oppositely inclined to the direction of the movement of grain from one end of the hulling member to the other.

In testimony whereof I have signed my name to this specification in the presence of two subscribing witnesses.

ALBERT B. COUCH.

Witnesses:
GLYNN DAVIS,
ALF TOLOR.

Copies of this patent may be obtained for five cents each, by addressing the "Commissioner of Patents, Washington, D. C."